United States Patent
Kunogi

[15] 3,655,313
[45] Apr. 11, 1972

[54] PLASTIC INJECTION MOLDING APPARATUS
[72] Inventor: Mahito Kunogi, Nagoya, Japan
[73] Assignee: Meiki Seisgkusho, Ltd., Nagoya City, Aichi-ken
[22] Filed: June 3, 1970
[21] Appl. No.: 43,019

[30] Foreign Application Priority Data

June 13, 1969 Japan..................................44/47085
Sept. 4, 1969 Japan..................................44/70229
Apr. 11, 1970 Japan..................................45/31025

[52] U.S. Cl.............................................425/130, 425/243
[51] Int. Cl.......................................................B29f 3/00
[58] Field of Search.............18/30 SM, 30 SP, 30 SQ, 30 SR, 18/30 SS, 12 SA, 12 SH, 12 SS:12 SP

[56] References Cited

UNITED STATES PATENTS

| | | | |
|---|---|---|---|
| 3,115,681 | 12/1963 | Hendry | 18/30 |
| 2,868,517 | 1/1959 | Lasch | 18/12 SS X |

FOREIGN PATENTS OR APPLICATIONS 1,439,303  4/1966  France..............................18/12 SH

OTHER PUBLICATIONS

" Machinery" magazine, Vol. 73, No. 10, June 1967, pages 67, 68 and 69, article title, " Injection Molding."

*Primary Examiner*—H. A. Kilby, Jr.
*Attorney*—John B. Armentrout

[57] ABSTRACT

An injection molding apparatus is provided characterized by having an injection screw rod rotatably and reciprocably mounted in a heating cylinder, there being a channel between the thread convolutions on the screw rod, and a portion of that channel correspondingly in the metering zone of the screw rod being shallow in depth within limits prescribed by empirical formula so as to have the screw rod efficiently constrain against backflow of molten plastic material on injection stroke, and there further being drive means and feed means interrelated in the apparatus for the feed means to supply raw plastic material to the screw rod in a feed zone of the latter at a rate commensurate with power demanded of the drive means for rotating the screw rod to feed raw plastic material forwardly from the feed zone being within practical limits.

9 Claims, 10 Drawing Figures

INVENTOR.
MAHITO KUNOGI

BY Oblon, Fisher & Spivak

ATTORNEYS

INVENTOR.
MAHITO KUNOGI

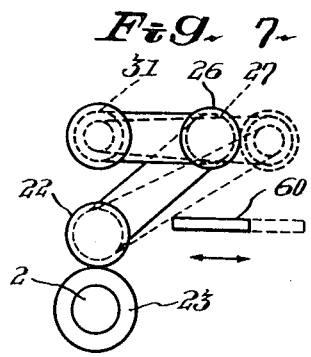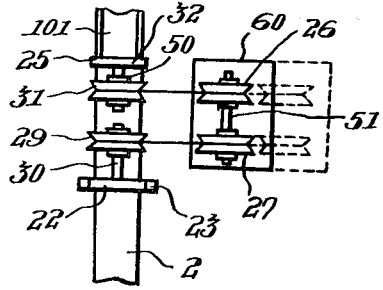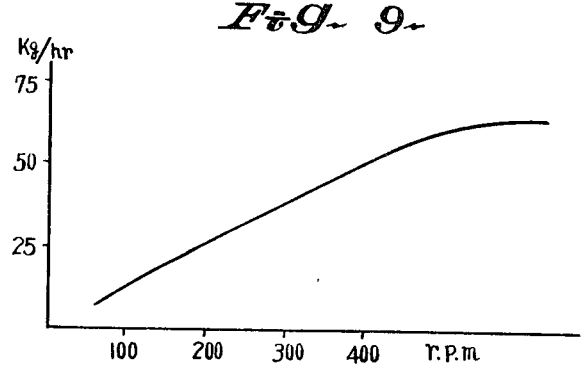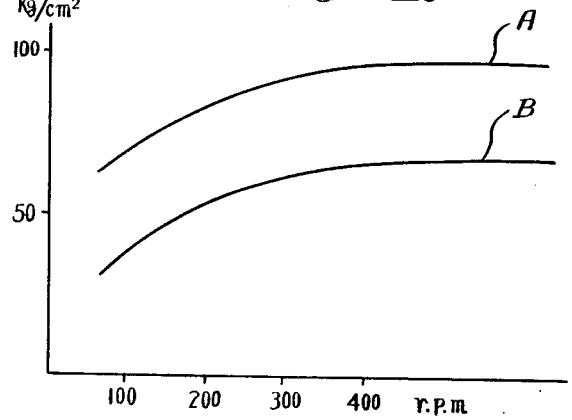

PLASTIC INJECTION MOLDING APPARATUS

The present invention relates to injection molding apparatus, and is more particularly concerned with the provision of injection molding apparatus for rotatably kneading and metering plastic material on a satisfactory compression ratio and for arresting backflow of kneaded plastic on injection stroke.

Injection molding machines of tapered screw type in the prior art offer advantages in that under the related operating conditions plastic material can be fed, kneaded, metered, and injected by means of the same screw. Injection molding machines of the character indicated also in instances have been arranged to arrest backflow of plastic material during the injection molding operation so as to prevent the efficiency of the injection molding operation from being reduced because of such backflow. However, most heretofore known arrangements for the purpose have been found within themselves to be inefficient. Ring valves commonly have been used for preventing backflow; however, ring valves are prone to be erratic in closing and thus can tolerate backward flow of plastic material in the interim, which, for example, leads to the provision of "short-shot" articles in the injection mold. Moreover, wear usually is produced at the surface where the ring valve contacts the rotating screw rod, thus becoming a factor in lowering the efficiency of injection. Then, too, quantities of the molten plastic material are likely to be entrapped and decomposed within the ring valve, thereby contributing tint to the product in the mold which cannot be tolerated where, for example, transparent molded products are desired.

Since any particular screw rod is characterized by having a predetermined compression ratio, it has been customary to replace the screw rod with another having a different compression ratio where the compression ratio is to be changed in order to deal with another kind of plastic which is to be acted upon and then injected into the mold; however, these alterations involve delay and expense. The present invention accordingly has been devised to overcome such disadvantages in the prior art.

It is a primary object of the present invention to provide an injection molding apparatus having a variable compression ratio in the absence of any need for replacing one injection screw rod with another, and thus to achieve the former feature through use of but one screw rod which furthermore is constructed for arresting backflow of plastic material without requiring an anti-backflow valve thereon during injection.

It is another object of the present invention to provide injection molding apparatus which is simple to produce and easy to operate and has a variable compression ratio, incorporating for the purpose a novel screw rod which is fed raw plastic material while driven.

It is further object of the present invention to provide an injection molding apparatus including a screw rod which within limits prescribed by formula has a substantially shallow channel depth along a length of the rod to produce a worthwhile kneading action and yet efficiently prevent backward flow of molten plastic during injection to the mold.

In accordance with the present invention, an injection molding apparatus for plastics is provided comprising a screw rod rotatably and reciprocably mounted in a heating cylinder, the rod having a thread defining between convolutions thereof a shallow channel coordinated so as to extend along a forward portion of the screw rod in a metering zone to prevent backward flow of molten plastic during injection, the latter rod being combined with feed means for feeding raw material to the rod screw thread in a feed zone at a rate which will not over-load the screw rod while the latter is rotatably driven in response to drive means and is feeding raw plastic forwardly and thereafter to be injected into a mold.

Preferred embodiments of the injection molding apparatus for plastics in accordance with the present invention will be described in detail hereinafter, by way of example, with reference to the accompanying drawings, in which:

FIG. 7 is an end view on an enlarged scale representing power transmission means for the feed screw shown in FIG. 6;

FIG. 8 is a plan view corresponding to FIG. 7; and

FIGS. 9 and 10 are graphs indicating results of experiments which will be described more fully hereinafter.

Figure 1:
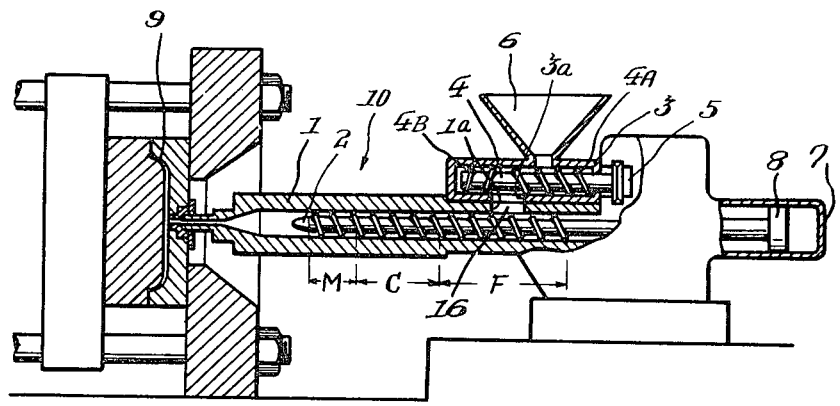
FIG. 1 is a side elevation partly in section representing an injection molding apparatus according to one embodiment.
Figure 2:
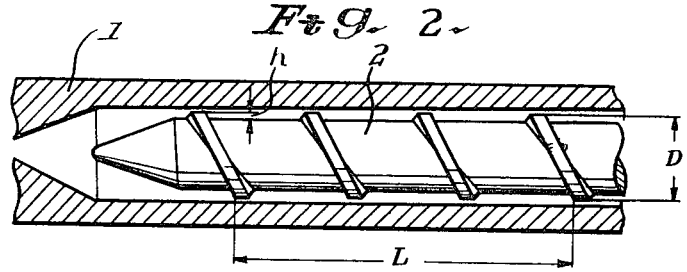
FIG. 2 is a longitudinal section on an enlarged scale representing a portion of the injection molding apparatus of FIG. 1.

Referring now more particularly to FIG. 1 of the drawings herein, an injection molding apparatus 10 is provided having a heating cylinder 1 and an injection screw rod 2 rotatably and reciprocably mounted therein. Further, the screw rod 2 may be regarded as having a metering zone M, a compression zone C and a feed zone F, and is provided with a thread having a compression ratio of large value, for instance greater than 4 to 1, for compressing the raw material. In the metering zone M, the difference h (see FIG. 2) in radius of the screw rod 2 at the ridge of the thread and at the bottom of the channel convoluted between the thread is a substantially small value within a range wherein the channel on this depth efficiently arrests back flow of plastic material on injection stroke of the screw rod. In certain embodiments the channel depth $h$ may be of the order of 1 millimeter effectively to serve the function of backflow arrestation and yet be within tolerable limits on heating in the metering zone M when plastic material is fed forwardly through the screw rod channel during rotation of the screw rod. No ring valve accordingly is needed on the screw rod.

From the foregoing, it will be understood that the efficiency of the injecting operation involving stroke of the screw rod is improved by reducing the channel depth $h$ of the screw rod in the metering zone M thereof. However, the efficiency $K$ of injection may indeed vary with diameter $D$ of the screw rod and length $L$ thereof along which the desired depth $h$ of channel is present. For this reason, an optimum value of $h$ was expressed as a function of $D$ and $L$ by introducing an empirical formula so as to obtain an injection efficiency $K$ within a satisfactory range. Generally, the relationship between $h$, $D$, $L$ and $N$ (which is equal to $1-K$) is expressed in case of Newtonian flow by Hagen-Poiseuille's formula, and in case of non-Newtonian flow by a Power Law formula having $K$ represent injection efficiency. In case of non-Newtonian flow, index $n$ of the Power Law formula varies according to conditions. Leading further toward the present invention, a formula, $$h = \alpha \sqrt[3]{LD\eta},$$

was introduced through considerations involving both of the above-mentioned formulae and through assuming a condition in the proximity of $N=1$. Experimental results then showed that the relationship between $h$, $L$, $D$ and $N$ do become controlling for indicating satisfactory injection efficiency without any check valve on the screw rod to arrest backflow, for purposes here when $\alpha=0.2$ and the value of $h$ in millimeters representing depth of the screw rod channel in the metering zone M is expressed in terms of diameter $D$ and length $L$, both also in millimeters, by the empirical formula:

$$h = 0.2 \sqrt[3]{L.D.\eta}$$

where $N$ usually is in the range of 0.01 to 0.1 and $L$ usually is in the range of $D$ to $3D$.

As shown in FIG. 1, a feed cylinder 3 for raw material, having a screw rod 4 mounted therein, is provided on the heating cylinder 1. The feed screw 4 includes a portion 4B having a lead in a sense opposite to that of portion 4A which meters raw material from a hopper 6 on the feed cylinder 3. The lead of portion 4B is intended to assure that all raw material fed by the screw 4 will be dropped into the injection cylinder 1.

Opening 1a is provided in the injection cylinder 1 and opening 3a is in the feed cylinder 3 so as to form a feed passage 16 into the feed zone of the screw rod 2. The number of revolutions of the feed screw 4 can be changed by means of suitable speed changing means 5 and the feed screw 4 is driven in conjunction with the screw rod 2, although the drive interconnection is not shown in this embodiment. However, if desired, both screws 2 and 4 may be driven independently and the amount of the raw material fed into the injection cylinder 1 may be adjusted such as by means, not shown, which is responsive to variations in the load on the screw 4 as detected by suitable detecting means also not shown.

The graphical representations in FIGS. 9 and 10 show results of experiments carried out on an injection screw rod constructed in accordance with the present invention and having in the metering zone M an outside diameter of 40mm and a channel depth $h$ of 1mm, and furthermore having a compression ratio of 4.4:1.

The graph in FIG. 9 introduces relationships between rpm of the screw rod and the plasticizing capacity (kg/hr) where the raw material is excessively supplied into the heating cylinder from a hopper.

The graph in FIG. 10 shows relationships between rpm of the screw rod and the oil pressure in kg/cm² in a hydraulic motor used in driving the same injection screw rod as that for FIG. 9. Curve A is for conditions involving excessive feed of the raw material into the heating cylinder by means of the same hopper as in FIG. 9, and curve B stands for the raw material being fed by means of raw material feed means according to the present invention. The curve B furthermore was drawn up by setting the number of revolutions of the injection screw rod to be the same as in curve A and meanwhile the number of revolutions of the raw material feed means were adjusted for supplying the raw material to the injection screw rod to be plasticized in accordance with the present invention and to be in the same amount as that when the raw material was fed according to curve A, and by then measuring the oil pressure for driving the screw rod.

Accordingly, as shown in FIG. 10, the oil pressure for driving the injection screw rod at any point on the curve B is substantially lower than that at the corresponding point on the curve A remembering, too, that the number of revolutions of the injection screw rod drive motor were the same and that the same amount of raw material was plasticized on the curve A and B for the given number of revolutions. For instance, the oil pressure will be 65 kg/cm² at 300 rpm according to the curve B, whereas the oil pressure correspondingly is 80 kg/cm² according to the curve A, thus indicating that the load in operating the injection screw rod according to curve B was less by 20 percent. Further, the experiments clearly confirm that the raw material fed to the injection screw rod according to curve A was excessive. In accordance with the present invention, therefore, power for driving the injection screw rod is saved through maintaining the quantity of raw material fed to the injection screw rod to be within a range of amounts which is optimum to the number of revolutions of the injection screw rod during the plasticizing operation. In this practice, the actual amount of raw material supplied from the feed means to the injection screw rod is inherently maintained to be such that thermal effects caused by flow of the raw plastic material in the heating cylinder are reduced.

In an injection molding apparatus according to the present invention, the torque required for driving the injection screw rod during plasticizing operations tends to be high in view of the convoluted channel of the injection screw rod being shallow, as represented by the aforementioned formula for $h$, so as to prevent backflow of the molten plastic material during injection. However, the torque may nevertheless be kept sensibly low by supplying the raw material on operation of the feed means so as to take advantage of the experiments described hereinabove. The plasticizing capacity thus had may be large. Although the conventional ring valve is eliminated, high efficiency of injection nevertheless is realized.

Compression ratio, under which the molten raw material is kneaded by the injection screw rod 2, may if desired be a selectively variable factor in the practice of the present invention. That is, the compression ratio may easily be adjusted by, for example, changing the number of revolutions of the feed screw 4 for varying the amount of raw material entering the injection molding apparatus. Assuming for purposes of illustration that the injection screw 2 inherently has a compression ratio of say 4.4:1, and the feed screw 4 has diameters measured at ridge and trough portions of the thread and a pitch of thread the same as those of the injection screw rod 2, this in the respective feed zones or raw material transferring portions thereof, and that the number of revolutions of the feed screw 4 is half of that of the injection screw rod 2, then raw material in the amount equal to one half the feed capacity of the injection screw rod 2 will be dropped into the heating cylinder 1 so as to be fed into the compression zone. If the raw material fed into the feed zone of the injection screw rod 2 is in the amount equal to the feed capacity thereof, the raw material thus received will be compressed to the volumetric capacity of the compression zone of the cylinder 1, that is, to 1/4.4 times the original volume. However, should the amount of raw material be supplied to the feed zone of the injection screw rod 2 in an amount equal to one half of the capacity of that feed zone, then the material fed to the compression zone of the cylinder 1 will be compressed to 1/2.2 times the original volume. In certain embodiments of the injection molding apparatus according to the present invention, the degree of compression accomplished by the injection screw rod 2 is varied without any need for changing the screw, the variation instead being achieved by the simple operation of changing the number of revolutions of the feed screw 4 relatively to that of the injection screw rod 2. The number of revolutions of the feed screw 4 may, for example, be remote controlled by using a continuously variable speed changing means 5 shown in FIG. 1.

Figure 3:
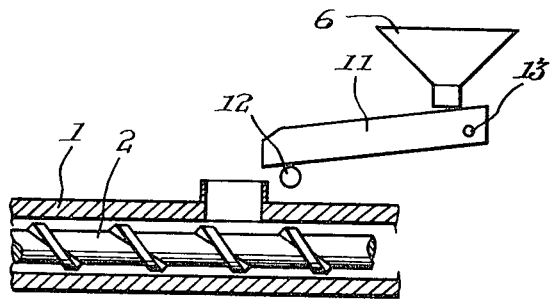
FIG. 3 is a side elevation showing a modified form of raw material feed means sometimes used in the practice of the present invention.

Referring to the embodiment represented in FIG. 3, the raw material may be supplied continuously into the heating cylinder 1 by using feed means of vibratory type. This feed means comprises a supply hopper 6, and a vibrating chute 11 adapted to be swung about a pivot axis 13 by action of an eccentric cam member 12.

Among the advantages derived from features noted above with reference to the present invention are:

1. The torque or power required for driving the injection screw rod is reduced through supply of proper amounts of raw material to this rod and a high injection efficiency furthermore is had in view of the shallow channel depth $h$ in the injection screw rod metering zone without any necessity for using a ring valve on the injection screw rod, and still further in certain embodiments the compression ratio of the injection molding apparatus is rendered variable.

2. The molded product is enhanced through having the molten plastic material rigorously kneaded when passing through the narrow gap formed at the metering zone of the injection screw rod.

3. The raw material will be melted quickly during action of the rotating injection screw rod for feeding of the raw material for injection molding operations to be sustained, and the raw material is uniformly and sufficiently plasticized under heat generated by the plastic when passing through the narrow gap formed in the metering zone of the injection screw rod.

4. Power required for the plasticizing operation is saved through interrelating the rate of feed of the feed means supplying the injection screw rod with raw plastic material and the rotational speed of the injection screw rod to provide tolerable power demand upon the means for driving the screw rod rotationally and since such controlled amounts of raw material are supplied to the injection screw rod in the feed zone thereof, heating effects caused by the raw material during plasticization are also to a measure controlled.

Figure 4:
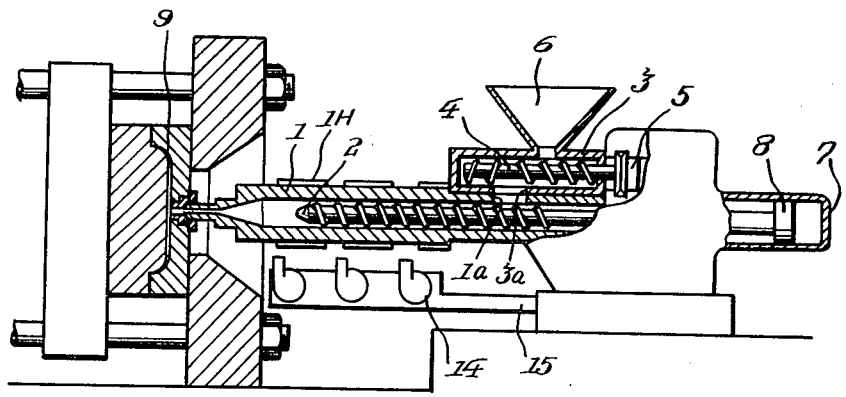
FIG. 4 is a view of injection molding apparatus similar to that of FIG. 1, though with cooling means mounted on the heating cylinder as an additional feature.

In accordance with the embodiment represented in FIG. 4, positive cooling means 14 is provided for absorbing heat generated on operation of the injection screw rod 2, the latter having a thread of substantially small channel depth $h$ as described hereinabove. Remembering that a considerably amount of heat will be generated in the heating cylinder 1, particularly in the region of the metering zone of the injection screw rod 2, due to flow of the molten plastic material, positive cooling in accordance with the present invention may sometimes become desirable such as in operating the injection molding apparatus at a high compression ratio or rapidly over prolonged periods of time. As represented in FIG. 4, a plurality of small blowing fans or sirocco fans 14 are mounted on a suitable support member 15 in position to direct a blast of air to the cylinder 1, which is provided with a number of heaters 1H mounted thereon. The cylinder 1 may instead, for example, be cooled by means of a water jacket (not shown) having water circulated therein, or the injection screw rod may be cooled by providing a passage therein through which cool water is circulated. Suitable automatic switches (not shown) have been incorporated in the cooling system of the embodiment of FIG. 4 so as to have the above-mentioned cooling fans turned on when the temperature of the structure reaches a predetermined high value and turned off when the temperature is below ambient.

Figure 5:
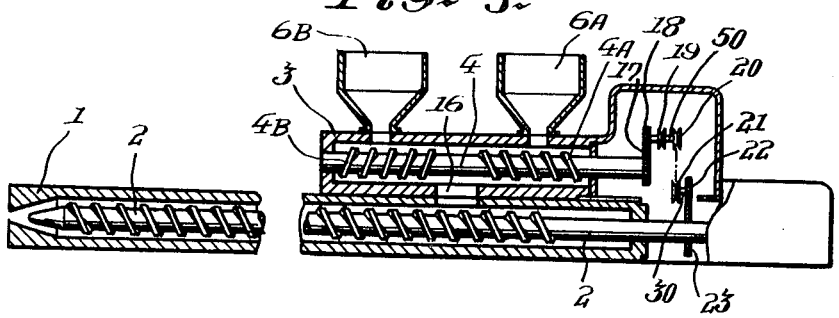
FIG. 5 is a broken away view in sectional elevation representing another modified form of feed means.

FIG. 5 represents another modification of the injection molding apparatus of FIG. 1. Since the injection screw rod 2 is provided with a thread having a substantially small channel depth $h$ in the metering zone, and there will accordingly be increased resistance to flow of the molten plastic material which tends to increase the torque demanded for driving the screw. Further in accordance with the present invention, however, this tendency is obviated by feeding amounts of raw material to the injection screw rod which are in keeping with torque demanded being kept with practical limits. In FIG. 5, two different kinds of raw material are supplied to the screw 2 from different supply hoppers 6A and 6B so as to be mixed on feed from the coaxial screw 4. The two supply hoppers 6A and 6B are mounted on the feed cylinder 3, and the coaxial feed screw 4 is rotatably mounted within the feed cylinder 3. The feed screw 4 is provided below supply hopper 6A with a thread 4A and below supply hopper 6B with a thread 4B having a lead opposite to that of the thread 4A for the threads to feed raw material on supply from both hoppers to the opening 16. The feed screw 4 is rotatably operatively connected with the screw rod 2, and is driven therewith through a pair of geared wheels 22 and 23, a shaft 30, a pair of pulleys 20 and 21, a shaft 50 and a pair of geared wheels 17 and 18. The geared wheel 23 is fixedly mounted on the shaft of the screw rod 2, and the geared wheel 17 on an end of the shaft of coaxial screw 4. The opening 16 is provided through the walls of the heating cylinder 1 and the supply cylinder 3 and leads to the feed zone of the screw rod 2.

Figure 6:
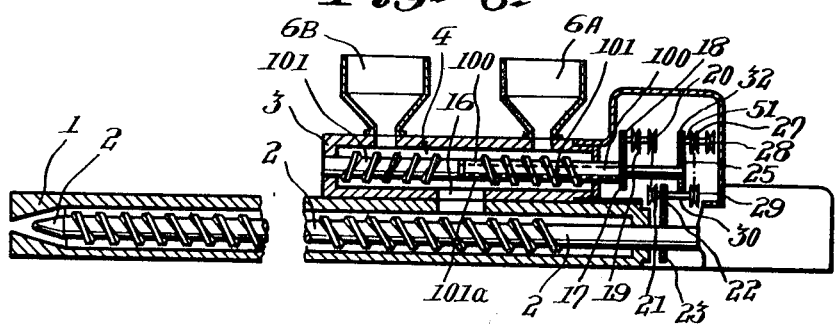
FIG. 6 is a broken away vertical section showing still another form of feed means.

FIG. 6 represents still another modification of the injection molding apparatus of FIG. 1. In this variation, the feed shaft 4 comprises two concentric shafts 100 and 101. Shaft 100 is hollow to form a sleeve over a reduced portion 101a of shaft 101 as shown. The feed shaft 100 is operatively connected to the screw rod 2 and is driven therewith in the same manner as in the FIG. 5 embodiment. Shaft 101 is also operatively connected to the screw rod 2 and driven therewith through a pair of geared wheels 22 and 23, a shaft 30, a pair of pulleys 27 and 29, a shaft 51, a pair of pulleys 26 and 31, a shaft 50 and a pair of geared wheels 25 and 32 (see FIGS. 7 and 8). The geared wheel 23 is fixedly mounted on the screw rod 2 and the geared wheel 25 on the feed shaft 101 at an end of the latter. Thread portions of both shafts 100 and 101 are located respectively below the supply hoppers 6A and 6B, and are rotatably driven independently at desired speeds. The above-mentioned pulleys 26 and 27 are of a variable diameter type and are mounted on a suitably movable support 60 so as to be driven at any of a number of different speeds as desired by moving the support 60 horizontally as shown in FIGS. 7 and 8. The pulley 20 in FIG. 5 is also of the same type. Therefore, both feed shafts 100 and 101 may be driven each according to a selected speed as desired. Both feed shafts 100 and 101 in certain embodiments may be connected independently to two different power drive means respectively instead of to but one drive means.

Referring further to FIG. 6, two different kinds of raw material are fed to the screw 2 through having the raw material propelled along the thread channel of the coaxial feed screws to the supply opening 16 and then dropped into the cylinder 1. Two kinds of raw material mixed together will be sufficiently kneaded in the metering zone M at the forward end portion of the screw and then stored in the forward space in the heating cylinder. When the stored raw material reaches a predetermined amount, it will be injected into the cavity of metallic dies of a mold by rectilinear stroke of the screw rod 2.

Plural material mixing and feeding injection molding apparatus according to the present invention has many advantages such as achieving mixing concurrently with feeding different kinds of raw material and plasticizing the same, and with reference to the foregoing embodiments, it will also be realized that the compression ratio of the injection screw rod may in effect be changed through changing the rate of feed from the feed screw means to the injection screw rod while the latter is, for example, driven a speed which is the same during the time that the injection molding apparatus is operating under the different compression ratios.

As the invention lends itself to many possible embodiments and as many possible changes may be made in the embodiments hereinbefore set forth, it will be distinctly understood that all matter described herein is to be interpreted as illustrative and not as a limitation.

I claim:

1. In an injection molding apparatus for plastics, the combination comprising, an injection screw rod rotatably and reciprocably mounted in a heating cylinder and provided with a screw thread and a convoluted channel intermediate said thread for feeding plastic material through said cylinder in a generally forward direction on forward-feed rotation of said screw rod, portions of said thread and channel extending on a forward portion of said screw rod to define a metering zone on forward-feed rotation of said screw rod with depth of said channel in said channel portion being within the range represented in millimeters by $h$ in the empirical formula:
$$h = 0.2 \sqrt[3]{LD\eta}$$
$D$ being the outside diameter of said screw thread portion, $L$ being the length of said forward portion of said screw rod, both $L$ and $D$ being in millimeters, and $\eta$ being a value in the range of about 0.01 to 0.1, for said forward portion of said screw rod to arrest backflow of plastic material in said cylinder during an injection stroke of said screw rod, and said screw thread and channel leading backwardly on said screw rod along intermediate and rearward portions of said screw rod from said screw rod forward portion for said screw thread and channel intermediately to be in a compression zone and rearwardly in a feed zone on forward-feed rotation of said screw rod, drive means for rotating said screw rod at a speed and in a direction for feeding raw plastic material forwardly from said feed zone in quantities to be plasticized commensurate with achieving a useful rate of metering of plasticized material from said metering zone, and feed means for supplying raw plastic material to said screw thread in said feed zone at a rate commensurate with power demand on said drive means being within practical limits while said screw rod is driven at said speed of rotation on operation of said drive means and is issuing plasticized material from said metering zone at said metering rate.

2. An injection molding apparatus for plastics as set forth in claim 1 wherein said feed means includes feed screw means communicating with said feed zone and driven for metering raw plastic material to said thread of said screw rod while said screw rod is rotating in response to said drive means and is feeding raw plastic material forwardly from said feed zone.

3. An injection molding apparatus for plastics as set forth in claim 2 wherein said feed screw means includes a feed screw having a first thread portion disposed beneath supply hopper means so as to receive and feed raw plastic material from said hopper means into an opening communicating in said heating cylinder with said feed zone, and said feed screw having a second thread portion communicating with said opening, and the lead direction of said second thread portion being opposite to the lead direction of said first thread portion.

4. An injection molding apparatus for plastics as set forth in claim 1 wherein cooling means is provided for reducing temperatures of said forward portion of said screw rod which tend to rise during forward-feed rotation of said screw rod in said heating cylinder.

5. An injection molding apparatus for plastics as set forth in claim 2 wherein hopper means is provided having a plurality of supply compartments communicating with said feed screw means and thence with said feed zone for said feed screw means to receive and feed a plurality of different kinds of raw plastic material from said compartments to said screw rod thread.

6. An injection molding apparatus for plastics as set forth in claim 2 wherein a variable speed transmission is interposed between said screw rod and said feed screw means for the ratio between the feed rates of said screw rod and said feed screw means to be varied.

7. An injection molding apparatus for plastics as set forth in claim 5 wherein said feed screw means includes a rotatably mounted first screw portion disposed beneath one of said plurality of supply compartments and operatively connected for rotating with said screw rod, and a second screw portion relatively rotatably mounted with reference to said first screw portion and disposed beneath another of said plurality of supply compartments, said second screw portion being operatively connected through a variable speed transmission with said screw rod for rotating with said screw rod and for speed of rotation of said second screw portion to be varied with reference to said speed of rotation of said first screw portion.

8. An injection molding apparatus for plastics as set forth in claim 1 wherein said rate of feed of said feed means and said speed of rotation of said screw rod are interrelated for said screw rod rotating in response to said drive means and on feed of said feed means to have in effect a compression ratio less than maximum.

9. An injection molding apparatus for plastics as set forth in claim 1 wherein said rate of feed of said feed means and said speed of rotation of said screw rod are variably interrelated for controlling said screw rod rotating in response to said drive means and on feed of said feed means to have in effect a selectively different compression ratio.

* * * * *